United States Patent [19]
Schmidt et al.

[11] Patent Number: 4,840,666
[45] Date of Patent: Jun. 20, 1989

[54] LACQUER, AND PROCESS FOR PRODUCING ANTI-CORROSION COATINGS

[75] Inventors: Helmut Schmidt, Höchberg; Helmut Patzelt, Kist; Gerhard Tünker; Horst Scholze, both of Würzburg, all of Fed. Rep. of Germany

[73] Assignee: Fraunhofer-Gesellschaft zur Förderung der angewandten Forschung e.V., Munich, Fed. Rep. of Germany

[21] Appl. No.: 185,268

[22] Filed: Apr. 18, 1988

Related U.S. Application Data

[63] Continuation of Ser. No. 792,840, Oct. 30, 1985.

[30] Foreign Application Priority Data

Oct. 31, 1984 [DE] Fed. Rep. of Germany ....... 3439880

[51] Int. Cl.$^4$ ................................................. C04B 9/02
[52] U.S. Cl. ............................. 106/14.05; 106/14.41; 106/287.14; 524/263; 524/264; 524/269
[58] Field of Search ............... 106/1.17, 287.14, 14.05, 106/14.41; 524/263, 264, 269

[56] References Cited

U.S. PATENT DOCUMENTS

| 3,801,522 | 4/1974 | Vasta | 106/287.14 |
| 4,154,617 | 5/1979 | Keithler | 106/1.17 |
| 4,184,880 | 1/1980 | Huber et al. | 106/15.05 |
| 4,631,207 | 12/1986 | Price | 427/387 |

Primary Examiner—Amelia Burgess Yarbrough
Attorney, Agent, or Firm—Oblon, Spivak, McClelland, Maier & Neustadt

[57] ABSTRACT

A lacquer system which essentially comprises a silicic acid heteropolycondensate, a flake-shaped or lamellar filler, a solvent and, if appropriate, a conventional synthetic resin for lacquers is suitable for producing anti-corrosion coatings, especially on glass surfaces.

13 Claims, No Drawings

LACQUER, AND PROCESS FOR PRODUCING ANTI-CORROSION COATINGS

This application is a continuation of application Ser. No. 792,840 filed on Oct. 30, 1985 now abandoned.

The invention relates to a lacquer based on organically modified silicates and to its use for producing anti-corrosion coatings, especially on glass.

Anti-corrosion coatings for glass or glass surfaces must conform to special requirements. In addition to the required barrier action to corrosive media, such as steam or gases containing $SO_2$, glass surfaces present the special problem of how to achieve moisture-resistant substrate adhesion of the anti-corrosion coating. It is true that the adhesion to glass can be improved by subjecting the substrate which is to be coated to special pretreatments, for example with organic solvents or acidic gases, but these methods are not applicable to the anticorrosion coating of for example works of art made in glass, such as, say, medieval church windows.

It is therefore the object of the invention to provide a lacquer and a process for producing anti-corrosion coatings which exhibit excellent adhesion to the substrate even under moist conditions and are in particular suitable for protecting chemically unstable glass without a special pretreatment.

The anti-corrosion lacquer according to the invention contains (1) a silicic acid heteropolycondensate which has been prepared by hydrolysis and polycondensation of (a) at least one organosilane of the general formula I

$$R_mSiX_{4-m} \qquad (I)$$

where R is alkyl, alkenyl, aryl, aralkyl, alkylaryl, arylalkenyl or alkenylaryl, X is hydrogen, halogen, hydroxyl, alkoxy, acyloxy or the group $-NR'_2$ (R'=hydrogen and/or alkyl) and m is 1, 2 or 3, and at least one of the following components (b), (c) and (d):

(b) one or more silicon-functional silanes of the general formula II

$$SiX_4 \qquad (II)$$

where X has the above meaning, but not all the radicals X are hydrogen, (c) one or more oxides, which have low volatility and are soluble in the reaction medium, of an element of main groups Ia to Va or of sub-groups IIb to Vb of the periodic table or one or more compounds, which form such an oxide of low volatility, of these elements, and (d) one or more organo-functional silanes of the general formula III

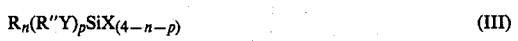

$$R_n(R''Y)_pSiX_{(4-n-p)} \qquad (III)$$

where R and X have the above meaning, R'' is alkylene, arylene, alkylenearylene, alkenylene or alkenylenearylene, it being possible for these radicals to be interrupted by oxygen or sulfur atoms or $-NH-$ groups, Y is halogen or an optionally substituted amino, amide, aldehyde, alkylcarbonyl, carboxyl, hydroxyl, mercapto, cyano, alkoxy, alkoxycarbonyl, sulfonic acid, phosphoric acid, acryloxy, methacryloxy, glycidyloxy, epoxy or vinyl group, n is 0, 1 or 2 and p is 1, 2 or 3, with $n+p$ being 1, 2 or 3, it also being possible, in the case of the starting components (a) and (d), to use oligomers, soluble in the reaction medium, of these silanes, (2) a filler in flake or lamellar form and (3) a solvent for the silicic acid heteropolycondensate.

Preferably, the silicic acid heteropolycondensate contains 20 to 95 mole percent of the organosilane (a), 0 to 20 mole percent of the silicon-functional silane (b), 0 to 20 mole percent of the oxide component (c) and 0 to 60 mole percent of the organo-functional silane (d), the total proportion of components (b), (c) and/or (d) being at least 5 mole percent.

The invention further relates to a process for producing anti-corrosion coatings in which the lacquer described above is applied to the surface to be protected and dried, and to the substrates coated in this manner.

An essential constituent of the anti-corrosion lacquer according to the invention is a silicic acid heteropolycondensate as described, for example, in DE-OS Nos. 2,758,414 and 3,011,761. These publications also describe special embodiments and processes for the preparation of the silicic acid heteropolycondensate.

However, coatings of these known silicic acid heteropolycondensates are not suitable as anti-corrosion coatings, since they are water vapor-permeable and show no corrosion-inhibiting action on either metallic or nonmetallic substrates. On chemically unstable glass they can even have the converse effect, since, due to the hindrance to their being transported away, corrosion products accumulate at the interface, and accelerate the corrosion.

It has now been found, surprisingly, that by embedding certain fillers a markedly improved barrier action can be achieved. These fillers are in the form of thin flakes or lamellae which, by suitable application techniques, can be arranged parallel and then act as a diffusion barrier layer. As a result of the mutually overlapping contact of the flake-shaped or lamellar fillers, the formation of diffusion channels for water vapor and other harmful substances is prevented.

As flake-shaped or lamellar fillers, inorganic materials are preferred and transparent materials particularly preferred. Specific examples are glass lamellae, for example glass flakes having a thickness of 3 to 4 μm and a diameter of 0.4 to 3.2 mm (Flake-Glass C from Corning) or lamellae produced from Duran (borosilicate) glass films and having a thickness of 3 to 10 μm, as well as mica lamellae, for example so-called fine mica (Merck) having a thickness of 0.4 μm and a diameter of less than 15 μm or larger types of mica with diameters of up to 100 μm or more.

Anti-corrosion coatings produced from the lacquer system according to the invention are distinguished by excellent moisture-resistant adhesion of the binder (silicic acid heteropolycondensate) both to the filler and to the glass surface. By a suitable choice of composition of the silicic acid heteropolycondensate it is possible to match the refractive indices of the binder and filler to one another in such a way that the filler does not show up and the coating is transparent. In this way it proved possible, for the first time, to provide a usable anticorrosion system for chemically unstable glass, for example medieval works of art in glass.

However, the invention is not restricted to the anti-corrosion coating of glass, and instead other substrates, for example metals, plastics or ceramic materials, can be provided with protective coatings. Because of their electrical insulating properties and their surprisingly high electrical breakdown strength, the coatings according to the invention can be employed in, for example, the production of printed circuit boards.

As a further binder component, alongside the silicic acid heteropolycondensate, the anti-corrosion lacquer according to the invention can optionally contain a conventional synthetic resin for lacquers, for example a polyacrylate, polymethacrylate, polyamide, polyvinyl chloride, ethylene/vinylacetate copolymer, phenolic resin or cellulose derivative. The proportion of this lacquer synthetic resin in the total binder component (silicic acid heteropolycondensate plus lacquer synthetic resin) is preferably at most 50 percent by weight.

As solvents, all the solvents conventionally employed in the lacquer industry can be used in the anticorrosion lacquer according to the invention. Special examples are aromatic hydrocarbons, such as toluene, esters, such as ethyl acetate and butyl acetate, ketones, such as acetone, alcohols, such as methanol or n-butanol, and mixtures of these solvents. In addition to the components already mentioned, the anti-corrosion lacquer according to the invention can optionally contain other conventional lacquer additives in the amounts usually added, for example leveling agents.

The weight ratio of the binder components (silicic acid heteropolycondensate and, optionally, lacquer synthetic resin) to solvent is preferably 1:1 to 1:20. The weight ratio of the binder components to the filler is preferably 3:7 to 5:1.

To produce anti-corrosion coatings, the lacquer system according to the invention is applied to the surface to be protected, and is dried. Though any desired application techniques can be used, two methods have proved particularly advantageous with a view to achieving the desired diffusion barrier layer (plane-parallel arrangement and orientation of the filler particles).

In one of the coating methods, the filled lacquer is sprayed with a conventional spray gun, in a plurality of coats (for example three or four times) onto the surface to be protected, an intermediate drying operation being carried out between the individual spray coatings. As a result of the repeated partial redissolving of the coats, and drying of the coats, which thus take place, a reorganization of the coating structure occurs and the arrangement of the filler lamellae becomes increasingly more parallel. The weight ratio of the binder components to the solvent when spraying the lacquer is preferably 1:1 to 1:6, while the weight ratio of the binder components to the filler is preferably 1:1 to 2:1. The spraying process is rather more suitable for flake-shaped or lamellar fillers of relatively small diameter ($\leq 100$ μm); particularly good results are achieved with fine mica.

The other coating method is more universally applicable (ie. also to fillers of larger diameter); in this, the unfilled lacquer is first applied to the surface to be protected and before the lacquer coat has dried tackfree the filler is sprinkled onto it, or the lacquer coat is brought into contact with a bed of filler, after which the filler adhering to the lacquer coat is pressed down and this process is repeated once or several times, if necessary. In that case, the unfilled lacquer has a weight ratio of binder components to solvent of, preferably, 1:10 to 1:20.

In this coating method, but also in the firstmentioned method, one or more topcoats of the unfilled lacquer can subsequently still be applied (for example by spraying); for this purpose, the lacquer preferably has a weight ratio of binder components to solvent of 1:1 to 1:10.

The coating can be hardened thermally. In a particular embodiment, the hardening of the binder component is promoted by admixing a titanium ester or a zirconium ester to the lacquer system before the latter is applied to the surface to be coated. These titanium esters or zirconium esters have, for example, the general formula IV

$$M(OR''')_4$$

where M is titanium or zirconium and $R'''$ is a straight-chain or branched alkyl radical of 1 to 6 carbon atoms. The amount of titanium ester or zirconium ester used is preferably 1 to 20 percent by weight, based on the silicic acid heteropolycondensate.

According to the invention it is for example possible to provide glass or glass surfaces with a transparent anti-corrosion coating. The invention is also suitable for the production of electrical circuit boards having a breakdown-resistant anti-corrosion coating.

The examples which follow illustrate the invention.

EXAMPLE 1

A lacquer system adapted to the refractive index of the glass to be coated is produced by mixing a silicic acid heteropolycondensate of 62.5 mole percent of diphenylsilane, 32.5 mole percent of methylvinylsilane and 5 mole percent of tetraethoxysilane with poly(methyl methacrylate) in a weight ratio of 7:3 and dissolving the resulting binder component in ethyl acetate, in a weight ratio of 1:4. Thereafter, fine mica is admixed in a weight ratio of binder component to mica of 1:1 and the mixture is homogenized for 1 to 3 hours by means of a stirrer.

The lacquer obtained is introduced into a spray gun and sprayed onto the vertical glass surface. A pinhole-free coating is obtained by overspraying three to four times. Between the individual spray coatings, an intermediate drying is carried out until the surface is no longer tacky (5 to 10 minutes). The thickness of the lacquer coats is 8 to 10 μm, depending on the amount applied; the total coating thickness is in the range from 30 to 40 μm.

After the last application of the fine mica lacquer and drying of the latter, a mica-free dilute lacquer solution (dilution 1:4 to 1:10) is sprayed onto the substrate, lying horizontal, after which the coating is dried for 18 to 24 hours at room temperature. The lacquer thickness thus applied is 20 to 30 μm.

Thereafter, two further overcoatings with micafree lacquer at dilutions of 1:4 to 1:5 are carried out, with drying for 18 to 24 hours between these. After the final drying, lasting for three days, the coating thickness is found to be 50 to 100 μm, depending on the amount of overcoating applied.

EXAMPLE 2

To produce a lacquer system matched to the refractive index of the glass surface to be coated, the silicic acid heteropolycondensate used in Example 1 is mixed with poly(methyl methacrylate) in a weight ratio of 1:1 and diluted with ethyl acetate in a weight ratio of 1:10 to 1:20. On applying this lacquer system to the surface to be coated, coating thicknesses of 10 μm are achieved.

Before the lacquer surface has dried, glass flakes of 0.4 mm diameter are sprinkled onto the lacquer coat and pressed down, or else the glass flakes are spread on a suitable film (for example Hostaflon) and the lacquered substrate is pressed down on the bed of glass flakes. Up to three layers of glass flakes are applied in this manner.

The layer is wetted with unfilled lacquer (dilution 1:20) and is again sprinkled with glass flakes. In total, three treatments of this type are carried out, with up to ten layers of glass flakes being obtained.

After the coating has dried for three hours, it is overcoated with an unfilled lacquer (dilution 1:1) of matching refractive index, after which the coating is again dried for at least 1 day.

We claim:

1. An anti-corrosion lacquer containing:
   (1) a silicic acid heteropolycondensate prepared by hydrolyzing and polycondensing:
   (a) at least one organosilane of the formula I:

$$R_m SiX_{4-m} \qquad (I)$$

wherein R is alkyl, alkenyl, aryl, aralkyl, alkylaryl, arylalkenyl or alkenylaryl, X is hydrogen, halogen, hydroxyl, alkoxyl, acyloxy or the group —NR'$_2$, wherein R' is hydrogen or alkyl, with each being the same or different, and m is 1, 2 or 3, and at least one of the following components (b), (c) and (d):
   (b) one or more silicon-functional silanes of the formula II:

$$SiX_4 \qquad (II)$$

wherein X has the above meaning, with the proviso that not all of the radicals X are hydrogen,
   (c) one or more oxides, which have low volatility and are soluble in the reaction medium, of an element of main groups Ia to Va or of subgroups IIb to Vb of the periodic table or one or more compounds, which form such an oxide of low volatility, of these elements, and
   (d) one or more organo-functional silanes of the formula III:

$$R_n(R''Y)_p SiX_{(4-n-p)} \qquad (III)$$

wherein R and X have the above meaning, R" is alkylene, arylene, alkylenearylene, alkenylene or alkylenearylene, wherein said R" radicals are uninterrupted or interrupted by oxygen or sulfur atoms or —NH— groups, Y is halogen or an amino, amide, aldehyde, alkylcarbonyl, carboxyl, hydroxyl, mercapto, cyano, alkoxy, alkoxycarbonyl, sulfonic acid, phosphoric acid, acryloxy, methacryloxy, glycidyloxy, epoxy or vinyl group, n is 0, 1 or 2 and p is 1, 2 or 3, with n+p being 1, 2 or 3, wherein the total proportion of components (b), (c) or (d) or (b), (c) and (d) is at least 5 mole percent,
   (2) a filler in flake or lamellar form, and
   (3) an organic solvent capable of dissolving said silicic acid heteropolycondensate.

2. The lacquer as claimed in claim 1, which contains mica or glass flakes as the filler.

3. The lacquer as claimed in claim 1, wherein the weight ratio of the resin constituents (silicic acid heteropolycondensate and lacquer synthetic resin) to solvent is 1:1 to 1:20.

4. The lacquer as claimed in claim 1, wherein the weight ratio of the resin constituents (silicic acid heteropolycondensate and lacquer synthetic resin) to solvent is 3:7 to 5:1.

5. The lacquer as claimed in claim 1, wherein said silicic acid heteropolycondensate comprises diphenylsilane, methylvinylsilane and tetraethoxysilane.

6. The lacquer as claimed in claim 1, wherein said filler is selected from the group consisting of glass flakes, borosilicate glass lamellae, and mica lamellae.

7. The lacquer as claimed in claim 6, wherein said glass flakes have a thickness of 3–4 μm and a diameter of 0.4–3.2 mm; said borosilicate glass lamellae have a thickness of 3–10 μm; and said mica lamellae are either a fine mica with the lamellae having a thickness of 0.4 μm and a diameter of less than 15 μm or a larger lamellae having a diameter of up to 100 μm or more.

8. The lacquer as claimed in claim 1, wherein said organic solvent for the silicic acid heteropolycondensate is selected from the group consisting of toluene, ethyl acetate, butyl acetate, acetone, methanol and n-butanol or a mixture thereof.

9. The lacquer as claimed in claim 1, which further comprises a binder selected from the group consisting of a polyacrylate, polymethacrylate, polyamide, polyvinyl chloride, ethylene/vinyl acetate copolymer, phenolic resin and a cellulose derivative.

10. The lacquer as claimed in claim 9, wherein the binder and said silicic acid heteropolycondensate together comprise about 50% by weight of the lacquer.

11. The lacquer as claimed in claim 9, wherein the weight ratio of the binder to the solvent is about 1:1 to 1:6, respectively; and the weight ratio of the binder to the filler is about 1:1 to 2:1, respectively.

12. The lacquer as claimed in claim 9, wherein the weight ratio of the binder to the solvent is about 1:10 to 1:20, respectively.

13. The lacquer as claimed in claim 9, wherein the weight ratio of the binder to the solvent is about 1:1 to 1:10, respectively.

* * * * *